United States Patent Office 2,949,465
Patented Aug. 16, 1960

2,949,465

1-THIOCYANOMETHYL-1H-BENZOTRIAZOLE AND 3-THIOCYANOMETHYL-1,2,3-BENZOTRIAZIN-4(3H)-ONE

Chien-Pen Lo, Philadelphia, Pa., assignor to Rohm & Haas Company, Philadelphia, Pa., a corporation of Delaware No Drawing. Filed Apr. 15, 1959, Ser. No. 806,432

3 Claims. (Cl. 260—248)

This invention deals with 1-thiocyanomethyl-1H-benzotriazole and 3 - thiocyanomethyl - 1,2,3 - benzotriazin-4(3H)-one and with their preparation. These compounds are potent agents for controlling fungi on growing plants.

Some thiocyanates have found use as insecticides and while it has been suggested that thiocyanates may act as fungicides, practical action of this kind is most unusual for members of this class of compounds. It is not possible to predict whether an organic thiocyanate will have fungicidal action.

These compounds are prepared by reacting the corresponding halomethyl compound with a salt of thiocyanic acid. As most suitable starting materials, there is used 1 - chloromethyl - 1H - benzotriazole, 1 - bromomethyl-1H - benzotriazole, 3 - chloromethyl - 1,2,3 - benzotriazin - 4(3H) - one, or 3 - bromomethyl - 1,2,3 - benzotriazin-4(3H)-one, the halogen of the halomethyl groups having an atomic weight of at least 35. The salt of thiocyanic acid may be ammonium, sodium, potassium, calcium, or the like thiocyanate.

The reaction of these materials is carried out preferably in an inert, volatile organic solvent, such as acetone, ethylene dichloride, benzene, or lower alkanol. A water-miscible solvent is preferred.

Reaction mixture is heated between 50° C. and 125° C. The desired product is isolated by removing solvent or precipitating the thiocyano compound by dilution of reaction mixture with water. If desired, the product may be purified as by crystallization.

Additional details of preparation are given in the following illustrative examples, wherein parts are by weight unless otherwise specified.

Example 1

There are mixed 17 parts of 1-chloromethyl-1H-benzotriazole, 10 parts of potassium thiocyanate, and 75 parts of acetone. The mixture is heated with stirring under reflux with an overhead temperature of 57° C. for three hours. It is then poured into 300 parts of water. A solid forms. It is filtered off, washed with water, and air-dried. The yield is 18 parts of product, 1-thiocyanomethyl-1H-benzotriazole. It has a melting point of 128°–131° C. Analysis of this product corresponds to that of the designated structure, there being 29.5% of nitrogen and 16.8% of sulfur (theory 29.2% and 16.6% respectively).

It has the structure

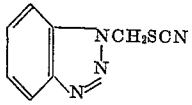

When the corresponding bromomethyl compound is used, the same end product is obtained. Instead of the 1-chloromethyl- or 1-bromomethyl-1H-benzotriazole, there may be used corresponding starting materials having one or more unreactive substituents in the phenyl ring thereof, such as chlorine, nitro, or alkyl.

Example 2

There are mixed 20 parts of 3-chloromethyl-1,2,3-benzotriazin-4(3H)-one, 10 parts of potassium thiocyanate, and 75 parts of acetone. The mixture is heated under reflux with stirring for two hours. It is then poured into cold water. A solid separates, is filtered off, washed, and dried. This product, amounting to 21 parts, contains by analysis, 24.9% of nitrogen and 13.3% of sulfur and corresponds by composition to 3-thiocyanomethyl - 1,2,3 - benzotriazin - 4(3H) - one, for which the theoretical values are 25.7% of nitrogen and 14.7% of sulfur. The compound melts at 118°–120° C. It has the structure

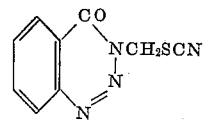

In the standard fungitoxicity test performed with spores of test organisms on slides 1-thiocyanomethyl-1H-benzotrazole gave an $ED_{50}$ value of less than 5 p.p.m. against *Alternaris solani* and against *Monolinia fructicola*, and of 5–10 p.p.m. against *Stemphylium sarcinaeforme*.

It was not phytotoxic to young tomato plants when applied in a 1% spray.

In the standard fungitoxicity test on slides 2-thiocyanomethyl - 1,2,3 - benzotriazin - 4(3H) - one gave $ED_{50}$ values of less than 5 p.p.m. against *Alternaris solani*, of 5–10 p.p.m. against *Monolinia fructicola*, and of 10–50 p.p.m. against *Stemphylium sarcinaeforme*.

This compound was non-phytotoxic to young tomato plants which were treated with a spray containing 1% thereof.

These compounds were also evaluated for their activity against late blight on tomato plants. In this evaluation test young plants are sprayed with a suspension of the compound under test at several concentrations, dried and sprayed with a suspension of spores of *Phytophthora infestans*. Some plants are sprayed only with a suspension of spores as controls. All plants are held under carefully controlled conditions of temperature and moisture. Counts are made of lesions which result and the $ED_{50}$ value determined.

$ED_{50}$ values of 180 were found for both of the compounds prepared in Examples 1 and 2. At the same time a standard zineb was applied. It gave an $ED_{50}$ value of 360.

The compounds of this invention are generally used in compositions in which the active agent is mixed with an inert carrier. Dusts may be prepared by mixing a compound with a finely divided solid, such as talc, clay, pyrophyllite, diatomaceous earth, hydrated silica, or magnesium carbonate. If desired, wetting and/or dispersing agents may be admixed. When the proportion of these is increased, there results a wettable powder, which may be taken up in water and applied from a spray.

The dusts may contain 1% to 15% of the thiocyanomethyl compound, while the wettable powders may contain up to 50% or even more of one or both of these compounds.

A typical formulation of a wettable powder comprises 20% to 50% of active agent, 45% to 75% of one or more finely divided solids, 1% to 5% of a wetting agent, and 1% to 5% of a dispersing agent. Typical wetting agents include sodium dodecyl sulfate, sodium sulfosuccinate, sodium alkylbenzenesulfonates, alkylphenoxypolyethoxyethanol, or other non-ionic, such as the ethylene and/or propylene oxide condensates with long-chained carboxylic acids, alcohols, or mercaptans.

Emulsifiable liquid concentrates may also be prepared with an organic solvent and a solvent-soluble emulsifier, such as one or more non-ionic surface active agents, or other solvent-soluble wetting agent.

Other pesticidal agents may be used along with the above thiocyanomethyl compounds, including insecticides, miticides, and other fungicides.

I claim:
1. A compound selected from the class consisting of 1-thiocyanomethyl-1H-benzothiazole and 3-thiocyanomethyl-1,2,3-benzotriazin-4(3H)-one.
2. 1-thiocyanomethyl-1H-benzotriazole.
3. 3-thiocyanomethyl-1,2,3-benzotriazin-4(3H)-one.

No references cited.

UNITED STATES PATENT OFFICE

CERTIFICATE OF CORRECTION

Patent No. 2,949,465                  August 16, 1960

Chien-Pen Lo

It is hereby certified that error appears in the printed specification of the above numbered patent requiring correction and that the said Letters Patent should read as corrected below.

Column 4, line 5, for "-1H-benzothiazole" read -- -1H-benzotriazole --.

Signed and sealed this 4th day of April 1961.

(SEAL)
Attest: ERNEST W. SWIDER

~~XXXXXXXXX~~
Attesting Officer

ARTHUR W. CROCKER
Acting Commissioner of Patents